United States Patent
Rathnam et al.

(10) Patent No.: US 11,817,741 B2
(45) Date of Patent: Nov. 14, 2023

(54) ELECTRIFIED VEHICLE HAVING ELECTRIC MACHINE STATOR WITH SLOT POCKET

(71) Applicant: FORD GLOBAL TECHNOLOGIES, LLC, Dearborn, MI (US)

(72) Inventors: Singar Rathnam, Farmington Hills, MI (US); Joel Hetrick, Ann Arbor, MI (US); Akash Changarankumarath Pradeepkumar, Westland, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 210 days.

(21) Appl. No.: 17/210,128

(22) Filed: Mar. 23, 2021

(65) Prior Publication Data
US 2022/0311290 A1 Sep. 29, 2022

(51) Int. Cl.
| | |
|---|---|
| *H02K 1/16* | (2006.01) |
| *H02K 1/276* | (2022.01) |
| *H02K 3/34* | (2006.01) |
| *H02K 7/00* | (2006.01) |
| *H02K 21/14* | (2006.01) |
| *B60K 6/28* | (2007.10) |

(52) U.S. Cl.
CPC ............ *H02K 1/165* (2013.01); *H02K 1/276* (2013.01); *H02K 3/345* (2013.01); *H02K 7/006* (2013.01); *H02K 21/14* (2013.01); *B60K 6/28* (2013.01); *B60Y 2200/91* (2013.01); *B60Y 2200/92* (2013.01); *B60Y 2400/60* (2013.01)

(58) Field of Classification Search
CPC .. B60K 6/28; B60Y 2200/91; B60Y 2200/92; B60Y 2400/60; H02K 1/16; H02K 1/165; H02K 1/27; H02K 1/276; H02K 21/24; H02K 3/34; H02K 3/345; H02K 7/006
USPC ......... 310/156.56, 156.57, 216.069, 216.096
See application file for complete search history.

(56) References Cited

U.S. PATENT DOCUMENTS

| | | | | | |
|---|---|---|---|---|---|
| 3,842,493 | A | * | 10/1974 | Ohuchi | H02K 1/16 29/605 |
| 3,886,256 | A | * | 5/1975 | Ohuchi | H02K 1/16 310/216.106 |
| 4,260,925 | A | * | 4/1981 | Barrett | H02K 19/24 310/216.095 |
| 4,665,329 | A | * | 5/1987 | Raschbichler | H02K 1/06 310/216.065 |
| 5,359,249 | A | * | 10/1994 | Tanaka | H02K 1/165 310/216.069 |
| 6,559,572 | B2 | * | 5/2003 | Nakamura | H02K 15/026 310/216.071 |
| 7,019,430 | B2 | * | 3/2006 | Ioi | H02K 1/165 310/216.043 |

(Continued)

*Primary Examiner* — Rashad H Johnson
(74) *Attorney, Agent, or Firm* — BROOKS KUSHMAN PC; David Kelley

(57) ABSTRACT

A vehicle, electric machine, and stator include stator teeth extending from a yoke portion toward a rotor and defining slots between adjacent teeth with windings positioned within the slots, wherein the teeth form pockets at connections to the yoke portion. Electrically insulating slot paper may line at least three sides of the slots. The pockets may extend into the teeth or the yoke portion where the teeth extend from the yoke portion, and may be filled with an electrically insulating compound that secures the insulating slot paper lining and electrically conductive rectangular windings within the slots.

17 Claims, 4 Drawing Sheets

(56) References Cited

U.S. PATENT DOCUMENTS

| | | | |
|---|---|---|---|
| 7,116,031 B2* | 10/2006 | Ahn | D06F 37/304 29/596 |
| 7,271,519 B2* | 9/2007 | Lee | H02K 15/026 310/216.041 |
| 7,728,481 B2* | 6/2010 | Lee | H02K 1/165 310/216.093 |
| 8,384,263 B2 | 2/2013 | Hiramatsu et al. | |
| 10,097,066 B2 | 10/2018 | Hanumalagutti et al. | |
| 2009/0085422 A1* | 4/2009 | Kusawake | H02K 1/148 310/216.069 |
| 2009/0218906 A1* | 9/2009 | Adachi | H02K 1/165 310/216.069 |
| 2011/0133580 A1* | 6/2011 | Sugimoto | H02K 1/20 310/54 |
| 2011/0204742 A1* | 8/2011 | Nakayama | H02K 3/345 310/215 |
| 2012/0326552 A1* | 12/2012 | Kinpara | H02K 1/165 310/216.069 |
| 2014/0209018 A1 | 7/2014 | Jin et al. | |
| 2014/0348673 A1* | 11/2014 | Tamamura | H02K 1/165 310/156.38 |
| 2015/0188366 A1* | 7/2015 | Hattori | H02K 3/16 310/208 |
| 2015/0295459 A1* | 10/2015 | Hao | B60K 6/48 310/156.53 |
| 2015/0326086 A1* | 11/2015 | Takahashi | H02K 3/34 310/45 |
| 2017/0063187 A1* | 3/2017 | Hao | H02K 21/14 |
| 2018/0109155 A1 | 4/2018 | Munoz et al. | |
| 2018/0248421 A1* | 8/2018 | Patel | H02K 15/024 |
| 2020/0227987 A1* | 7/2020 | Yamaguchi | H02K 3/345 |
| 2020/0235621 A1* | 7/2020 | Husain | H02K 1/16 |
| 2021/0006115 A1* | 1/2021 | Nehl | H02K 1/16 |
| 2021/0036568 A1* | 2/2021 | Schulz | H02K 3/12 |
| 2021/0218293 A1* | 7/2021 | Jannot | H02K 1/165 |
| 2021/0218294 A1* | 7/2021 | Saint-Michel | H02K 21/14 |
| 2021/0367483 A1* | 11/2021 | Yin | H02K 3/34 |
| 2022/0131431 A1* | 4/2022 | Coppola | H02K 1/2766 |
| 2022/0149677 A1* | 5/2022 | Abid | H02K 1/165 |
| 2022/0181937 A1* | 6/2022 | Deng | H02K 3/12 |
| 2022/0216743 A1* | 7/2022 | Leonardi | H02K 3/24 |
| 2022/0231560 A1* | 7/2022 | Leonardi | H02K 1/16 |
| 2022/0294299 A1* | 9/2022 | Hisada | H02K 3/48 |
| 2022/0311290 A1* | 9/2022 | Rathnam | B60K 6/48 |

\* cited by examiner

ELECTRIFIED VEHICLE HAVING ELECTRIC MACHINE STATOR WITH SLOT POCKET

TECHNICAL FIELD

This disclosure relates to an electrified vehicle and electric machine having a stator with slot features to facilitate flow of insulating resin, epoxy, varnish, or lacquer around a slot liner within the slots.

BACKGROUND

Electrified vehicles rely on a high voltage traction battery to provide power to an electric machine operable as a traction motor for propulsion. Electric machines include a stator that surrounds a rotor that rotates to generate electricity when operating as a generator or to produce torque when operating as a motor. The stator may be formed from stacked laminations having teeth that extend from a back iron or yoke to form an inner circumference with an air gap between the teeth and the rotor. The teeth define slots that may be lined with insulation paper prior to wrapping the electrically conductive windings that may be separated into multiple phases around sections of the circumference. Three-phase electric machines are commonly used in electrified vehicle applications. The stator slot liner protects the winding conductors during insertion into the stator slots and also provides additional insulation between the motor winding wires and the stator laminations. The slot liner insulation also provides extra insulation at the sharp edge or hairpin where the motor windings exit from the motor stator slots. After the stator is wound, the windings are further insulated with a resin, epoxy, varnish, lacquer or similar material to protect the windings from contamination and electrical shorting, and also to make the windings more mechanically rigid.

SUMMARY

Embodiments of the disclosure include a vehicle comprising a traction battery and an electric machine powered by the traction battery and configured to provide propulsive power to the vehicle. The electric machine includes a rotor separated by an air gap from a stator surrounding the rotor. The stator includes teeth extending from a yoke portion toward the rotor and defining slots between adjacent teeth with windings positioned within the slots, wherein the teeth form pockets at connections to the yoke portion. The stator teeth may form rounded triangular pockets at the connections to the yoke portion. The stator teeth may form rectangular slots having parallel sides extending from the pockets toward the air gap. The pockets may extend radially into the yoke portion, into a side portion of an associated tooth, or diagonally from an associated slot into an associated tooth and the yoke portion. Each pocket may connect to a side of an associated tooth at a distance from the yoke portion of less than one-half a radial thickness of one conductor of the windings. The stator may further comprise an insulating slot liner disposed between the windings and at least three sides of each of the slots. The insulating slot liner may comprise paper. The electric machine stator may further comprise an electrically insulating compound coating the windings and the slot liner and at least partially filling the pockets.

Embodiments may also include an electric machine comprising a rotor and a stator surrounding the rotor and separated by an air gap, the stator comprising teeth extending from a yoke portion toward the rotor and defining rectangular slots with electrically insulating slot paper lining at least three sides of the rectangular slots, wherein the slots include rounded pockets extending into the teeth or the yoke portion where the teeth extend from the yoke portion, and wherein the pockets are filled with an electrically insulating compound that secures the insulating slot paper lining and electrically conductive rectangular windings within the rectangular slots. The rounded pockets may extend from the yoke portion a radial distance less than half the radial width of a single conductor of the rectangular windings. The pockets may extend diagonally from an associated slot into both the teeth and the yoke portion, and may be rounded triangular pockets. The stator may comprise a plurality of stacked laminations.

In one or more embodiments, an electric machine stator comprises a yoke portion and teeth integrally formed of unitary construction with the yoke portion and extending from the yoke portion toward an inner circumference to form concave fillets between the teeth and the yoke portion. Adjacent teeth form a slot therebetween configured to receive an insulating slot liner and windings. The concave fillets are configured to facilitate flow of an electrically insulating fluid between the slot liner and the yoke-portion during assembly. The stator teeth may form triangular concave fillets with the yoke portion. The triangular concave fillets may extend into both the yoke portion and sides of the teeth, extend into sides of the teeth but not the yoke portion, or extend into the yoke portion without extending into sides of the teeth. The teeth may form rectangular slots, wherein the concave fillets extend less than half the radial width of a single rectangular conductor of the windings within the rectangular slots from the yoke portion.

Embodiments of the disclosure may provide one or more associated advantages. For example, electric machine stator laminations that have teeth defining slots with pockets where the teeth connect to the back iron or yoke of the stator core facilitate flow of varnish, epoxy, or other insulating compound between the slot liner insulation paper and the steel core during assembly. The improved flow of insulating compound and additional surface area in contact with the insulating compound after curing may improve noise, vibration, and harshness (NVH) performance of the electric machine during operation.

DETAILED DESCRIPTION

Figure 1:
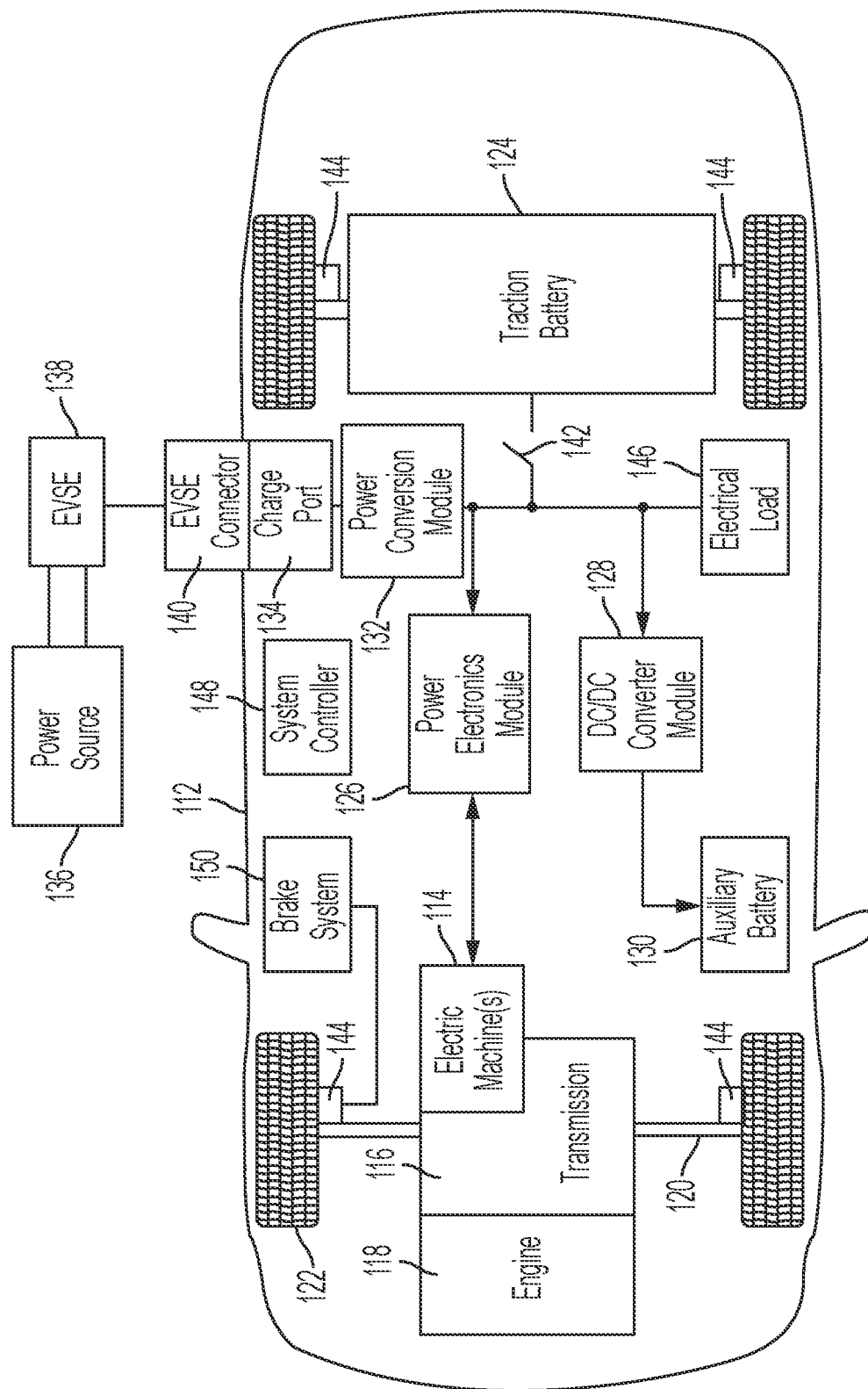
FIG. 1 is a diagram illustrating an electrified vehicle having an electric machine with stator laminations having slot features to facilitate insulating material flow during assembly.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electrified vehicles include one or more electric machines that may operate as a generator to power devices or store energy in a traction battery, or as a motor to provide torque to propel the vehicle. Electric machines include a rotor that rotates during operation within a stationary stator. The stator may be comprised of a plurality of stacked laminations. The laminations may be made of electric steel or other iron alloys. The laminations may have teeth extending from a back iron or yoke portion toward the a center opening that accommodates the rotor. The teeth define or form slots between adjacent teeth. Conductive windings may be wound throughout the slots to carry electric current. The slots may be sized (i.e., have a cross-sectional area sized) to house the windings. The relative cross-sectional area of the teeth and slots may be designed to provide maximum torque density. Increasing the cross-sectional area of the teeth provides increased channeling of magnetic flux improving torque density. Increasing the cross-sectional area of the slots allows the cross-sectional area of the windings to increase and reduces resistive copper losses. Therefore, stators may be designed to maximize the cross-sectional area of the teeth and the cross-sectional area of the slots.

Windings may be used to conduct electric current through the slots in the stator iron core, which induces the magnetic field. The windings may be one solid conductor for a single phase motor, or one solid conductor for each phase of a multiple phase motor. The individual conductors may have various cross-section geometries, such as round or rectangular (or square). The windings or individual conductors may have a coating (e.g., varnish, epoxy, resin, paint) to prevent cross-conduction between individual conductors. The windings may have the same cross-sectional areas to maintain uniform copper losses.

For multi-phase electric machines, the windings of different phases may be separated by an insulator to prevent short circuits between the windings because the electric potential between different phases may overcome insulation provided by ambient air and the varnish between the windings. The insulator may be line each of the slots and be referred to as a slot liner or insulation paper. An electrically insulating coating (that may be thermally conductive) may be applied to the windings, slot liner, and slots to improve the heat transfer characteristics, prevent electrical short circuiting, and provide mechanical rigidity of the assembly.

Various techniques may be used to apply the electrically insulating coating compound or material, including a dip and cure/bake, a trickle application, vacuum pressure impregnation, and resin sealing. Dip and bake application includes immersing the motor windings into a tank of insulating liquid (often twice to ensure full coverage) followed by heating in an oven to cure/harden the compound. In a trickle application, the winding is connected to a rotating table and electrical resistance is used to generate heat while rotating and a trickle stream of material is introduced to the winding head. The compound follows the wire into the entirety of the slot to reduce or eliminate the possibility of partial discharge in random windings. Once fully saturated, the current is increased in the windings to cure the compound while rotating. Vacuum Pressure Impregnation (VPI) utilizes a vacuum pressure tank filled with insulating compound or material to fully impregnate motor windings and insulation with resin or varnish. The windings may be preheated to improve performance with capacitance measured over multiple cycles to determine acceptable fill. Another alternative involves resin sealing or potting to insulate the windings by completely impregnating the coils and insulation with a high molecular weight thermoset polymer resin.

FIG. 1 depicts a representative electrified vehicle, which is a plug-in hybrid electric vehicle (HEV) in this example. Vehicle 112 may comprise one or more electric machines 114 mechanically connected to a transmission 116 having stator slots with pockets or features as described herein. The electric machines 114 may be capable of operating as a motor or a generator. In addition, the transmission 116 is mechanically connected to an internal combustion engine 118. The transmission 116 is also mechanically connected to a drive shaft 20 that is mechanically connected to the wheels 122. The electric machines 114 can provide propulsion and regenerative braking capability when the engine 118 is turned on or off. During regenerative braking, the electric machines 114 act as generators and can provide fuel economy benefits by recovering energy that would normally be lost as heat in the friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that can be used by the electric machines 114. A vehicle battery pack 124 typically provides a high voltage DC output. The traction battery 124 is electrically connected to one or more power electronics modules. One or more contactors 142 may isolate the traction battery 124 from other components when opened and connect the traction battery 124 to other components when closed. A power electronics module 126 is also electrically connected to the electric machines 114 and provides the ability to bi-directionally transfer energy between the traction battery 124 and the electric machines 114. For example, a typical traction battery 124 may provide a DC voltage while the electric machines 114 may require a three-phase AC current to function. The power electronics module 126 may convert the DC voltage to a three-phase AC current as required by the electric machines 114. In a regenerative mode, the power electronics module 126 may convert the three-phase AC current from the electric machines 114 acting as generators to the DC voltage required by the traction battery 124. The description herein is equally applicable to an electrified vehicle implemented as a pure electric vehicle, often referred to as a battery electric vehicle (BEV). For a BEV, the hybrid transmission 116 may be a gear box connected to an electric machine 114 and the engine 118 may be omitted.

In addition to providing energy for propulsion, the traction battery 124 may provide energy for other vehicle electrical systems. A typical system may include a DC/DC converter module 128 that converts the high voltage DC output of the traction battery 124 to a low voltage DC supply that is compatible with other vehicle loads. Other high-voltage loads, such as compressors and electric heaters, may be connected directly to the high-voltage without the use of a DC/DC converter module 128. The low-voltage systems may be electrically connected to an auxiliary battery 130 (e.g., 12V, 24V, or 48V battery).

The electrified vehicle 112 may be a BEV or a plug-in hybrid vehicle in which the traction battery 124 may be recharged by an external power source 136, or a standard hybrid that charges traction battery from operating electric machines as a generator but does not receive power from an external power source. The external power source 136 may be a connection to an electrical outlet. The external power source 136 may be electrically connected to electric vehicle supply equipment (EVSE) 138. The EVSE 138 may provide circuitry and controls to regulate and manage the transfer of energy between the power source 136 and the vehicle 112. In other embodiments, the vehicle 112 may employ wireless charging, which may be referred to as hands-free or contactless charging that uses inductive or similar wireless power transfer.

The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically connected to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically connected may transfer power using a wireless inductive coupling as previously described.

One or more wheel brakes 144 may be provided for friction braking of the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components that are required to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 to achieve desired operation. The brake system 150 may respond to driver commands and may also operate autonomously to implement features such as stability control. The controller of the brake system 150 may implement a method of applying a requested brake force when requested by another controller or sub-function.

One or more electrical loads 146 may be connected to the high-voltage bus. The electrical loads 146 may have an associated controller that operates the electrical load 146 when appropriate. Examples of electrical loads 146 may be a heating module or an air-conditioning module.

The various components described may have one or more associated controllers to control and monitor the operation of the components. The controllers may communicate via a serial bus (e.g., Controller Area Network (CAN)) or via discrete conductors. In addition, a system controller 148 may be present to coordinate the operation of the various components.

Figure 2:
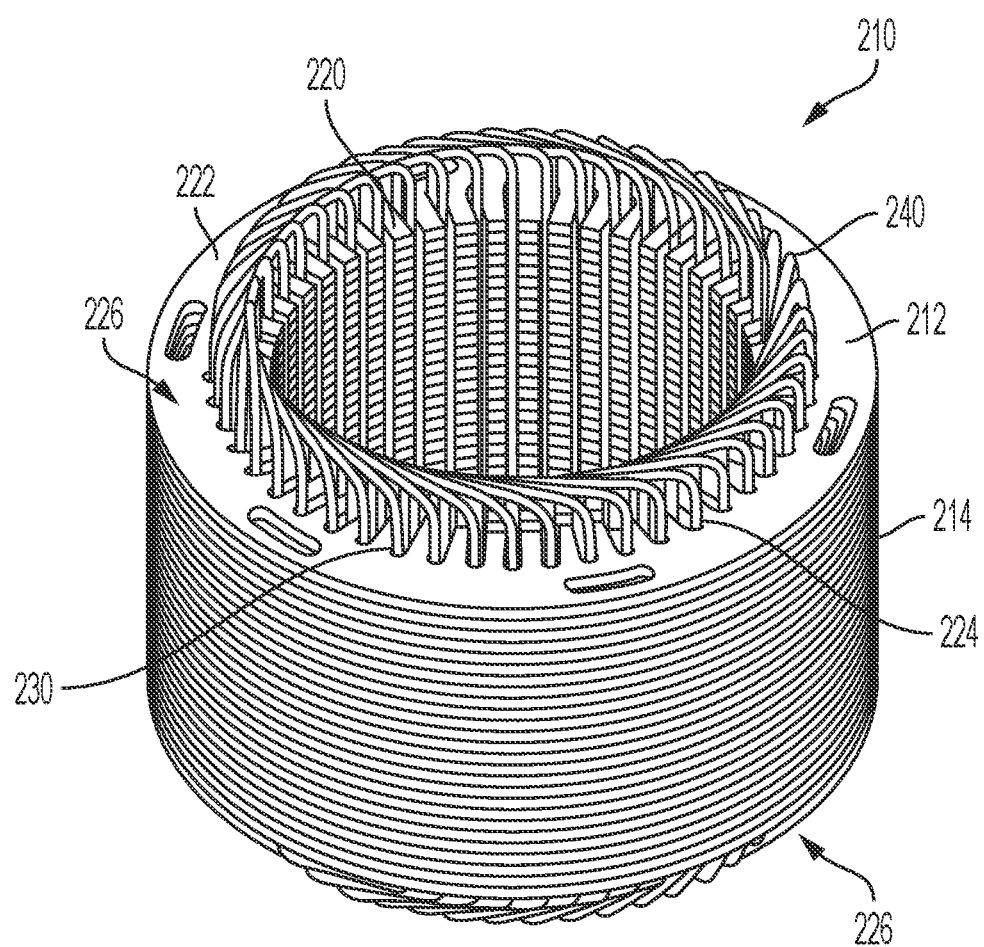
FIG. 2 is a perspective view of an electric machine stator illustrating stacked laminations with slot features.
Figure 3:
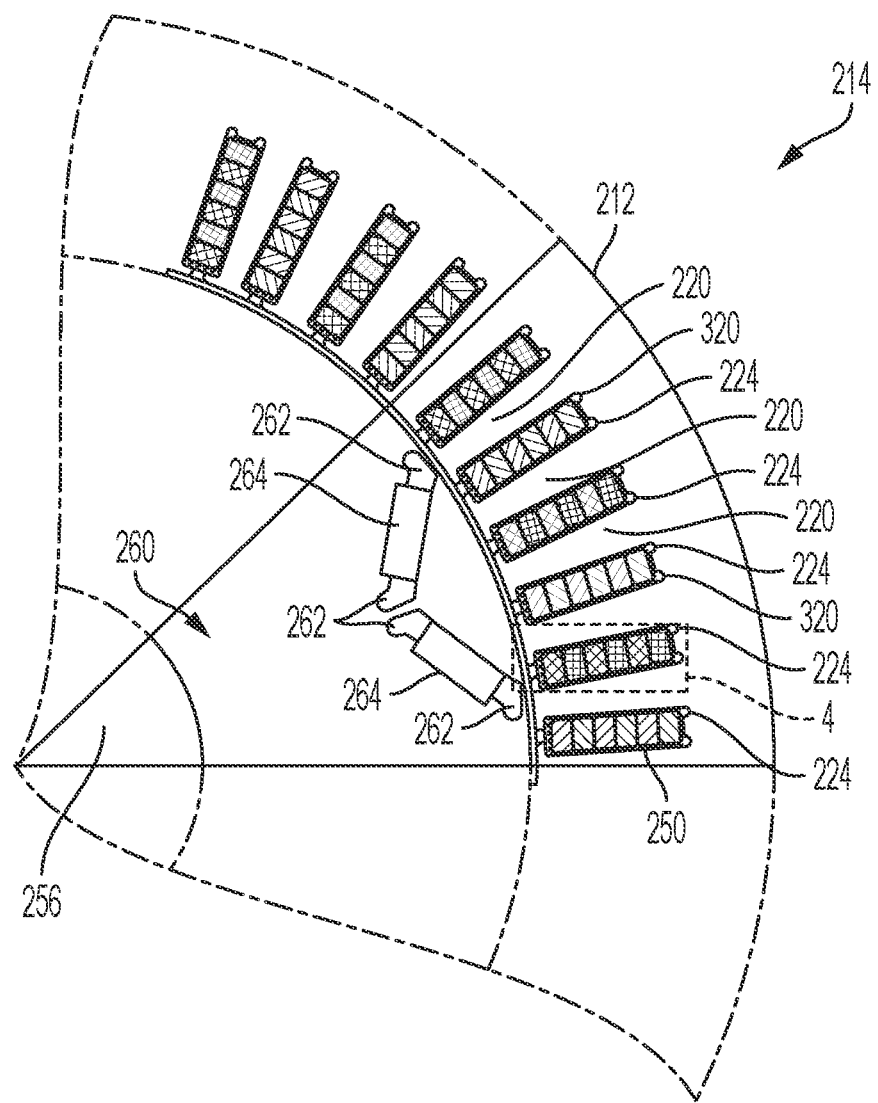
FIG. 3 illustrates a sector of an electric machine rotor and stator lamination having slot features.

FIG. 2 is a perspective view of a representative stator formed by stacked laminations each having stator slot features according to various embodiments of the present disclosure. FIG. 3 provides a plan view of a stator core and associated rotor separated by an air gap. With reference to FIGS. 2 and 3, electric machine 114 (FIG. 1) includes a stator 210 having a plurality of laminations 212. When stacked, the laminations 212 form a stator core 214. Each of the laminations 212 may have an annular or donut shape to accommodate a rotor 260 separated by an air gap and surrounded by the stator core 214. The rotor 260 may include cutouts 262 configured to secure permanent magnets 264, that may be paired to form magnetic poles. Rotor 260 may be mechanically connected to a shaft 256 using a complementary key and slot (not shown).

Each lamination 212 includes a plurality of teeth 220 integrally formed of unitary construction and extending radially inward from a back iron or yoke portion 222 toward the inner diameter. Adjacent teeth 220 cooperate to define slots 224. Each slot 224 includes a concave fillet or pocket (best shown in FIGS. 3-6) at or near where the teeth 220 extend from the yoke portion 222 as described in greater detail below. The teeth 220 of each lamination 212 are aligned such that stator slots 224 extend through the stator core 214 between the opposing end faces 226. The end faces 226 define the opposing ends of the core 214 and are formed by the first and last laminations 212. An electrically insluting slot liner (FIGS. 3-6) is positioned in the slots 224. A plurality of windings 230 are wrapped around various groups of teeth 220 and are disposed within the stator slots 224. Each slot 224 includes several passes or wraps of the conductors or wires 250 that form the windings 230. The number of conductor passes or wraps within each slot may vary depending on the particular application and implementation. In one embodiment, each slot 230 includes eight conductor wraps or passes.

The conductors or wires forming windings 230 may have various cross-sectional geometries, such as circular or rectangular (including square) depending on the particular application and implementation. The windings 230 may be disposed or potted in an insulating material or compound (not shown) such as a varnish, lacquer, epoxy, or resin, for example, that is applied as a liquid or fluid during assembly and at least partially fills the slot features (such as pockets, concave fillets, etc.) described herein prior to curing or hardening to form a rigid structure. Portions of the windings 230 generally extend in an axial direction along the stator slots 224. At the end faces 226 of the stator core 214, the windings 230 bend to extend in a circumferential direction around the end faces 226 forming the hairpins or end windings 240.

Figure 4:
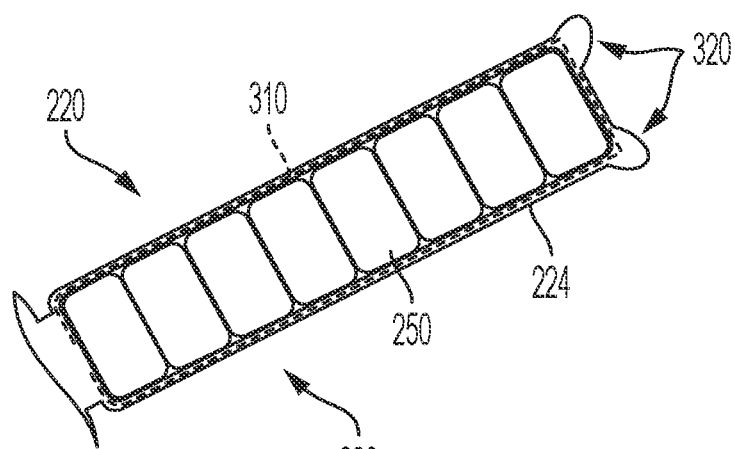
FIG. 4 illustrates a representative rectangular stator slot with pockets extending diagonally into the yoke portion and teeth.
Figure 5:
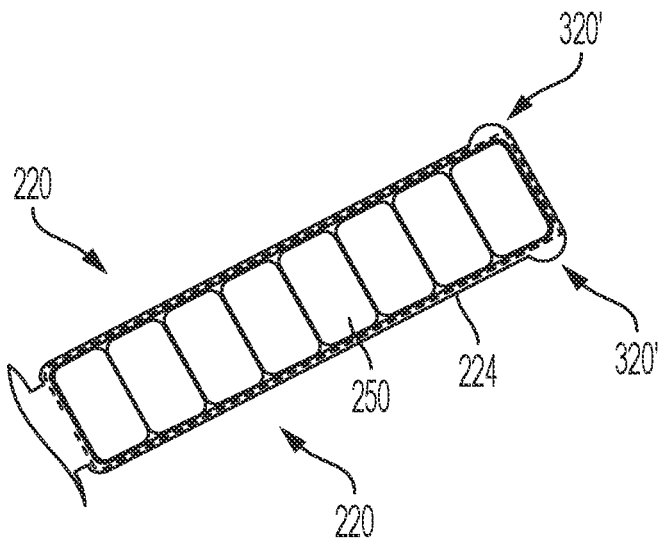
FIG. 5 illustrates a representative rectangular stator slot with pockets extending circumferentially into the teeth.
Figure 6:
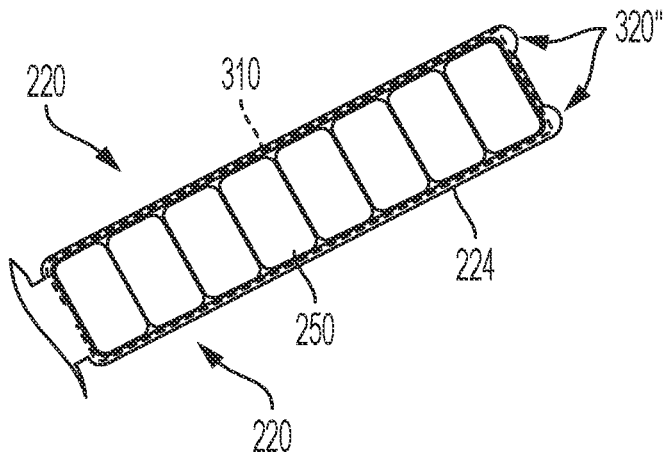
FIG. 6 illustrates a representative rectangular stator slot with pockets extending radially into the back iron or yoke portion.

FIG. 4-6 illustrate representative alternative configurations for stator slot features to facilitate flow of an electrically insulating material or compound such as varnish, lacquer, epoxy, or resin during assembly. In the representative embodiments illustrated, each slot 224 is rectangular in shape and accommodates eight windings of corresponding rectangular conductors 250. An electrically insulating slot liner 310 comprising an insulating paper extends around at least three sides of the slots 224. In the representative embodiments illustrated, slot liner 310 extends around all of the windings 250 within slots 224 with a small opening at the innermost winding. Slot liner 310 does not extend significantly into the pockets 320, 320', 320" so as not to restrict flow of the electrically insulating material. Concave fillets or pockets 320, 320', and 320" thus facilitate flow of an electrically insulating liquid compound or material to at least partially fill the slots 224 and pockets that is then cured or hardened during electric machine assembly and secures the insulating slot paper liner 310 and windings 250 within rectangular slots 224.

FIG. 4 illustrates a representative rectangular stator slot 224 with concave fillets or rounded pockets 320 at the connections to the yoke portion 222 extending into the both yoke portion 222 and the side wall of adjacent teeth 220. In this representative embodiment pockets 320 extend generally diagonally into the yoke portion 222 and teeth 220. Rectangular slot 224 is formed by adjacent stator teeth 220 having parallel sides extending from the pockets 320 toward the air gap between the stator and rotor. An insulating slot liner 310 extends around at least three sides of the rectangular slot 224 between teeth 220 and winding conductors 250. The configuration of FIG. 4 may provide more desirable NVH performance than the configurations of FIGS. 5 and 6, but may be more difficult to manufacture and have less desirable electromagnetic characteristics.

FIG. 5 illustrates a representative rectangular stator slot 224 with concave fillets or pockets 320' extending circumferentially into adjacent teeth 220. Pockets 320' connect to the sides of adjacent teeth 220 at a distance from the yoke portion 220' of less than one-half a radial thickness of one of the conductor windings 250. The configuration of FIG. 5 may provide various advantages with respect to manufacturing and NVH performance, but may result in less desirable electromagnetic characteristics.

FIG. 6 illustrates a representative rectangular stator slot 224 with pockets 320" extending radially into the back iron or yoke portion 222, but is otherwise similar to the configurations of FIGS. 4 and 5. The configuration of pockets 320" in FIG. 6 may provide various manufacturing advantages but less desirable for with respect to NVH and electromagnetic characteristics than the configurations of FIGS. 4 and 5 in some implementations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a traction battery; and
an electric machine powered by the traction battery and configured to provide propulsive power to the vehicle, the electric machine including a rotor separated by an air gap from a stator surrounding the rotor, the stator including teeth extending from a yoke portion toward the rotor and defining slots between adjacent teeth with windings positioned within the slots, wherein the teeth or the yoke portion define pockets in the slots, wherein the stator teeth form rectangular slots having parallel sides extending from the pockets toward the air gap, wherein the slots include an insulating slot liner disposed between the windings and at least three sides of each of the slots, and wherein the pockets are filled with an electrically insulating compound between the insulating slot liner and the teeth or the yoke portion.

2. The vehicle of claim 1 wherein the stator teeth form rounded pockets at the connections to the yoke portion.

3. The vehicle of claim 2 wherein the stator teeth form rectangular slots having parallel sides extending from the pockets toward the air gap.

4. The vehicle of claim 2 wherein the pockets extend radially into the yoke portion.

5. The vehicle of claim 2 wherein the pockets extend into a side of an associated tooth.

6. The vehicle of claim 2 wherein the pockets extend diagonally from an associated slot into both a sidewall of an associated tooth and the yoke portion.

7. The vehicle of claim 1 wherein each pocket connects to a side of an associated tooth at a distance from the yoke portion of less than one-half a radial thickness of one conductor of the windings.

8. An electric machine comprising:
a rotor; and
a stator surrounding the rotor and separated by an air gap, the stator comprising teeth extending from a yoke portion toward the rotor and defining rectangular slots with electrically insulating slot paper lining at least three sides of the rectangular slots, wherein the slots include rounded pockets extending into the teeth or the yoke portion where the teeth extend from the yoke portion, and wherein the pockets are filled with an electrically insulating compound that secures the insulating slot paper lining and electrically conductive rectangular windings within the rectangular slots.

9. The electric machine of claim 8 wherein the rounded pockets extend from the yoke portion a radial distance less than half the radial width of a single conductor of the rectangular windings.

10. The electric machine of claim 8 wherein the rounded pockets defined by the stator teeth have an apex disposed diagonally from an associated slot into both the teeth and the yoke portion.

11. The electric machine of claim 8 wherein the stator comprises a plurality of stacked laminations.

12. An electric machine stator comprising:
a yoke portion; and
teeth integrally formed of unitary construction with the yoke portion and extending from the yoke portion toward an inner circumference to form concave fillets between the teeth and the yoke portion, adjacent teeth forming a slot therebetween containing an insulating slot liner and windings, the concave fillets containing an electrically insulating fluid between the slot liner and the yoke-portion.

13. The electric machine stator of claim 12 wherein the teeth form concave fillets with the yoke portion.

14. The electric machine stator of claim 13 wherein the concave fillets extend into both the yoke portion and sides of the teeth.

15. The electric machine stator of claim 12 wherein the concave fillets extend into sides of the teeth but not the yoke portion.

16. The electric machine stator of claim 12 wherein the concave fillets extend into the yoke portion without extending into sides of the teeth.

17. The electric machine stator of claim 12 wherein the teeth form rectangular slots and wherein the concave fillets extend less than half the radial width of a single rectangular conductor of the windings within the rectangular slots from the yoke portion.

\* \* \* \* \*